United States Patent
Cai et al.

(10) Patent No.: US 11,138,105 B2
(45) Date of Patent: Oct. 5, 2021

(54) LARGE RANGE DEFECT ALLOCATION SYSTEM AND METHOD

(71) Applicant: Seagate Technology LLC, Cupertino, CA (US)

(72) Inventors: LiBin Cai, Singapore (SG); Jian Qiang, Singapore (SG); Kang Hai Lim, Singapore (SG); Choon Wei Ng, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 149 days.

(21) Appl. No.: 16/224,185

(22) Filed: Dec. 18, 2018

(65) Prior Publication Data

US 2020/0192795 A1 Jun. 18, 2020

(51) Int. Cl.
| | |
|---|---|
| *G06F 11/00* | (2006.01) |
| *G06F 12/02* | (2006.01) |
| *G06F 3/06* | (2006.01) |
| *G11B 20/18* | (2006.01) |

(52) U.S. Cl.
CPC .......... *G06F 12/0292* (2013.01); *G06F 3/064* (2013.01); *G06F 3/0608* (2013.01); *G06F 3/0676* (2013.01); *G11B 20/1883* (2013.01)

(58) Field of Classification Search
CPC .......................... G06F 11/1028; G06F 12/0292
See application file for complete search history.

(56) References Cited

U.S. PATENT DOCUMENTS

| | | | |
|---|---|---|---|
| 5,166,936 A | 11/1992 | Ewert et al. | |
| 6,442,715 B1 | 8/2002 | Wilson | |
| 6,636,985 B1 | 10/2003 | Ono et al. | |
| 6,701,465 B1 * | 3/2004 | Tashiro | G11B 20/18 714/5.1 |
| 7,200,771 B2 | 4/2007 | Bolt et al. | |
| 7,245,445 B2 | 7/2007 | Lee | |
| 7,487,388 B2 | 2/2009 | Kim et al. | |
| 7,817,364 B2 * | 10/2010 | Seng | G11B 20/1883 360/48 |
| 8,595,573 B2 * | 11/2013 | Shalvi | G06F 11/1008 714/718 |
| 8,856,438 B1 | 10/2014 | Warner et al. | |
| 9,146,683 B2 | 9/2015 | Wei et al. | |
| 2002/0120824 A1 * | 8/2002 | Hooper, III | G06F 3/0679 711/202 |
| 2006/0153037 A1 * | 7/2006 | Koda | G11B 20/1883 369/53.21 |
| 2006/0221804 A1 * | 10/2006 | Kuroiwa | G11B 20/1883 369/275.3 |
| 2009/0161512 A1 * | 6/2009 | Chen | G11B 20/1883 369/53.17 |

OTHER PUBLICATIONS

Google Search—see attached—text refined (Year: 2020).*
Google Scholar/Patents—text refined (Year: 2021).*

* cited by examiner

*Primary Examiner* — Christopher S McCarthy
(74) *Attorney, Agent, or Firm* — Westman, Champlin & Koehler, P.A.

(57) ABSTRACT

A method includes moving data in a defect range from a defective area of a data storage medium to a reserve area of the data storage medium, and identifying the defect range by an address of a start of the defect range and a defect length. A logical address table is updated with the address of the start of the defect range, the defect length and an offset to the reserve area.

11 Claims, 4 Drawing Sheets

LARGE RANGE DEFECT ALLOCATION SYSTEM AND METHOD

SUMMARY

In one embodiment, a method includes moving data in a defect range from a defective area of a data storage medium to a reserve area of the data storage medium, and identifying the defect range by an address of a start of the defect range and a defect length. A logical address table is updated with the address of the start of the defect range, the defect length and an offset to the reserve area.

In another embodiment, a data storage device includes one or more storage media that comprise a plurality of physical storage locations, a first portion of the physical storage locations substantially fixedly assigned to a plurality of logical storage locations, and a second portion of the physical storage locations assignable to an unassigned spare location. A controller is configured to receive a physical storage location large range defect reallocation request, and check a dedicated reserve area within the first portion of the physical storage locations for sufficient space to reallocate the large range defect. When there is sufficient space to reallocate the large range defect, data in the large range defect is moved to the dedicated reserve area, and the large range defect is remapped to the dedicated reserve area.

In another embodiment, a method of reallocating large range defects in a data storage drive includes receiving a large range defect reallocation request at a data storage drive controller, and checking a dedicated reserve area having a substantially fixed logical to physical mapping for sufficient space to reallocate the large range defect. If there is sufficient space in the dedicated reserve area to move the data in the large defect range, the method includes moving data in the large range defect to a portion of the dedicated reserve area, and remapping the large range defect to the portion of the dedicated reserve area in a remapping table.

This summary is not intended to describe each disclosed embodiment or every implementation of bond pad layouts in mold compound off silicon as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figures 1A, 1B:
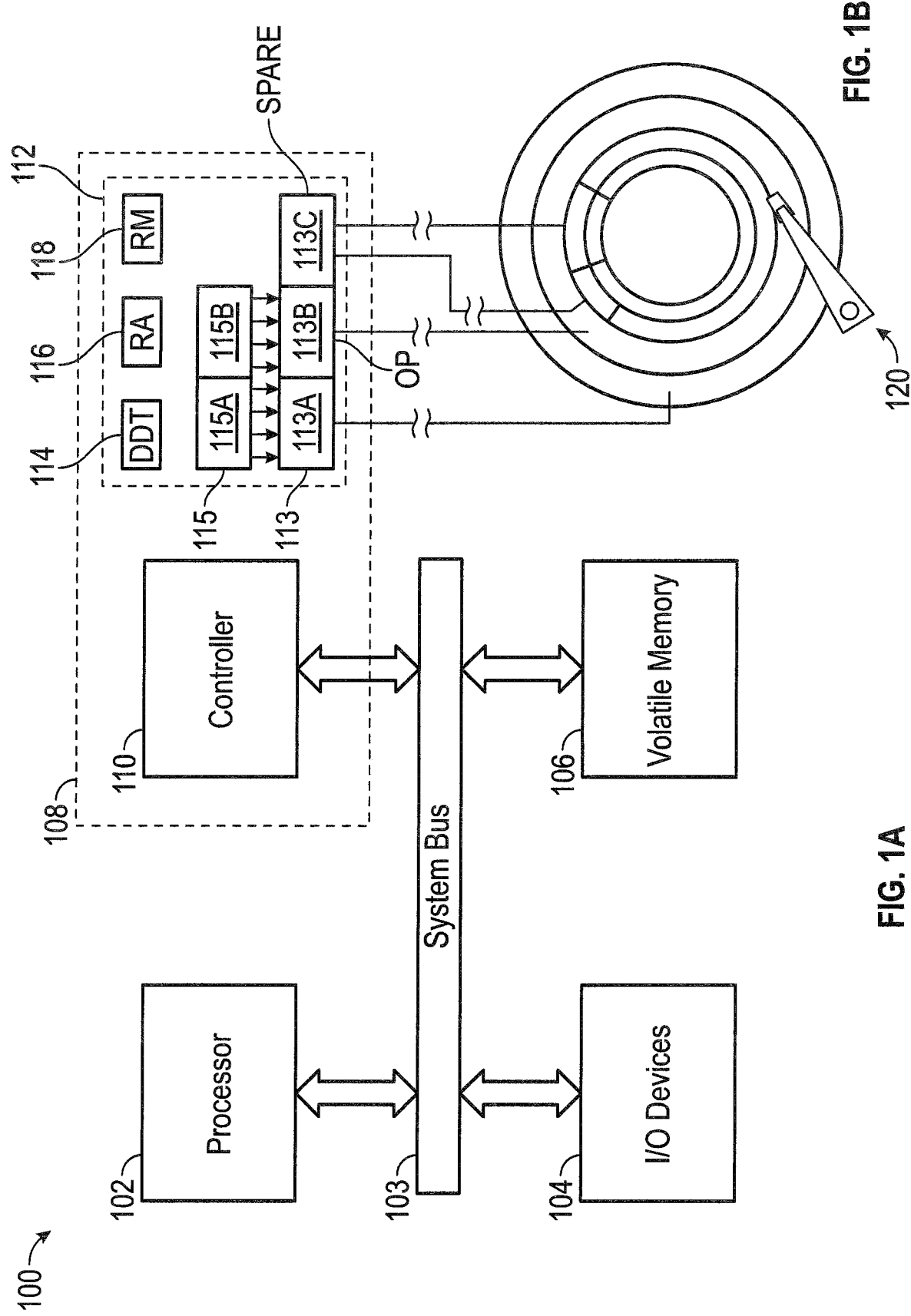
FIG. 1A is a simplified block diagram of an illustrative embodiment of a system of data storage management.
FIG. 1B shows a representative platter of a hard disk drive on which embodiments of the present disclosure may be practiced.

The disclosure is related to dynamic remapping of large range defects in data storage or memory devices.

In data storage devices such as hard disk drives (HDD) that have rotatable platters, as recording heads and other mechanical parts degrade with use, read/write operations at certain media zones on the platters may become unstable and cause defects. For current high density HDDs, even small defects pose a significant risk when dwell times are long, such as during a learning operation for a thin form factor hard drive. This can cause large range defects that can affect hundreds to thousands of tracks on a HDD.

These large range media defects may additionally be caused by scratches or the like, and during manufacturing, before sale, can be processed by defect slipping schemes. However, large range defects can also be incurred post-manufacturing, such as at customer quality checking, by end user use or misuse, and the like. Defect allocation post-manufacturing is difficult using traditional defect allocation schemes.

Specifically, existing defect reallocation schemes are designed for a single sector or wedge on a HDD. Existing defect allocation schemes process defects on a sector by sector basis. This can use a large number of extra read/write and verification operations, especially for defects that occur across multiple sectors, wedges, and/or tracks. The existing defect reallocation schemes record defects on a sector by sector basis in a reallocation table. Reallocation tables are typically limited in size to a few thousand rows. Making such tables larger to allow for large defect range reallocation would use a larger memory space, increasing costs. Further, since reallocation is done on a sector by sector basis, throughput for reallocated logical block addresses (LBA) in a large range slows operation down, in some cases to well below user expectations, as seek operations are performed also in a sector by sector reallocation scheme, and data caching may be insufficient. Embodiments of the disclosure that address such problems are described further below in connection with FIGS. 1A-5.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Referring to FIG. 1A, a particular embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory. The system bus may additionally be coupled to a memory device 108.

The memory device 108 may include a controller 110, which may be coupled to the processor 102 via a connection through the system bus 103. In one embodiment, the memory device 108 comprises at least one storage entity 112. In a particular embodiment, storage entity 112 includes a plurality of memories of various sizes and types. As shown in FIG. 1A, storage entity 112 is further organized a main store 113, such as one or more platters of a hard disk drive (HDD) as shown in FIG. 1B. In a HDD, a head 120 communicates with the data storage media (e.g., platters). Main store 113 has a set of physical locations identified as physical block addresses (PBAs). The PBAs are addressed by a set of drive logical block addresses (LBAs), which are used to point to a PBA. Each LBA points to a particular PBA within the main store.

The main store 113 is comprised in one embodiment of a number of physical blocks. The number of physical blocks exceeds a number of logical blocks 115, allowing for physical block replacement when defects occur in a physical block or blocks. In one embodiment, as further described below, a number of logical blocks 115 of the drive, while smaller than the number of physical blocks 113, is larger than a number of logical blocks used by a host (e.g., processor 102). For example, a logical space of a host may use 100 LBAs, LBA #0-LBA #99, a number of drive LBAs that exceeds that of the host may be, for example 200 LBAs, LBA #0-LBA #199, and the drive may have 250 physical blocks, at PBA #0-PBA #249.

A set of tables is maintained by the memory device 108 to allow translation of a host LBA to an actual physical location in the main store 113, transparent to the host. These tables are discussed in greater detail below, but include a data defect table (DDT) 114 which is set at manufacture; a reassignment table (RA) 116 for maintaining mapping of small defects using a sector by sector allocation scheme; and a remapping table (RM) 118 for maintaining mapping of large range defects. Physical locations within the disk are allocated according to the tables. It should be understood that tables 114, 116, and 118, while shown in storage entity 112, may also be in controller 110 without departing from the scope of the disclosure.

During operation, the processor 102 may send commands and data to the memory device 108 to retrieve or store data. The controller 110 can receive the commands and data from the processor 102 and then manage the execution of the commands to store or retrieve data from storage entity 112, using the tables 114, 116, and 118. It should be noted that controller 110 may include one or more integrated circuits.

As indicated above, in some embodiments, write commands received in memory device 108 from processor 102 or any other suitable sending interface include data addressed by host LBAs. Device 108 processes the received commands and ultimately stores the data accompanying the received commands into storage entity 112. In one embodiment, two ranges 115A and 115B of drive LBAs 115 are substantially permanently assigned to physical locations 113A and 113B of main store 113. A third portion 113C of main store 113 is an unassigned spare area. Drive LBAs 115A mapped to PBA 113A are used to store data associated with host LBAs. Drive LBAs 115B are a reserve or over-provisioning area and are used in one embodiment for large range defect remapping in the field. Unassigned spare area 113C is used for reassignment of small defects in the field.

When a defect occurs in a physical location assigned to one of these LBAs, that LBA along with the physical block associated with it is retired. DDT table 114 maintains the LBA table after manufacturing, as is discussed below.

Embodiments of the present disclosure make use of dynamic LBA remapping scheme to reallocate large range defects, which uses smaller amounts of memory relative to the sector reallocation scheme while maintaining drive performance. Embodiments of the present disclosure provide methods for reallocation of large ranges of tracks, due to defects, transparently to the end-user.

Figure 2A:
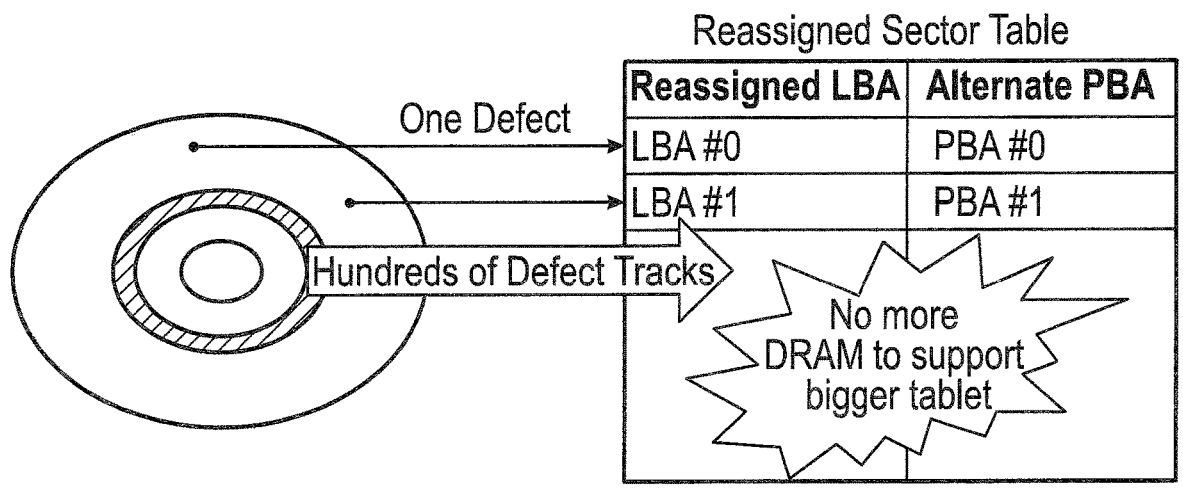
FIG. 2A is a diagram showing a disk with a large range defect that cannot be accommodated by a reassigned sector table.
Figure 2B:
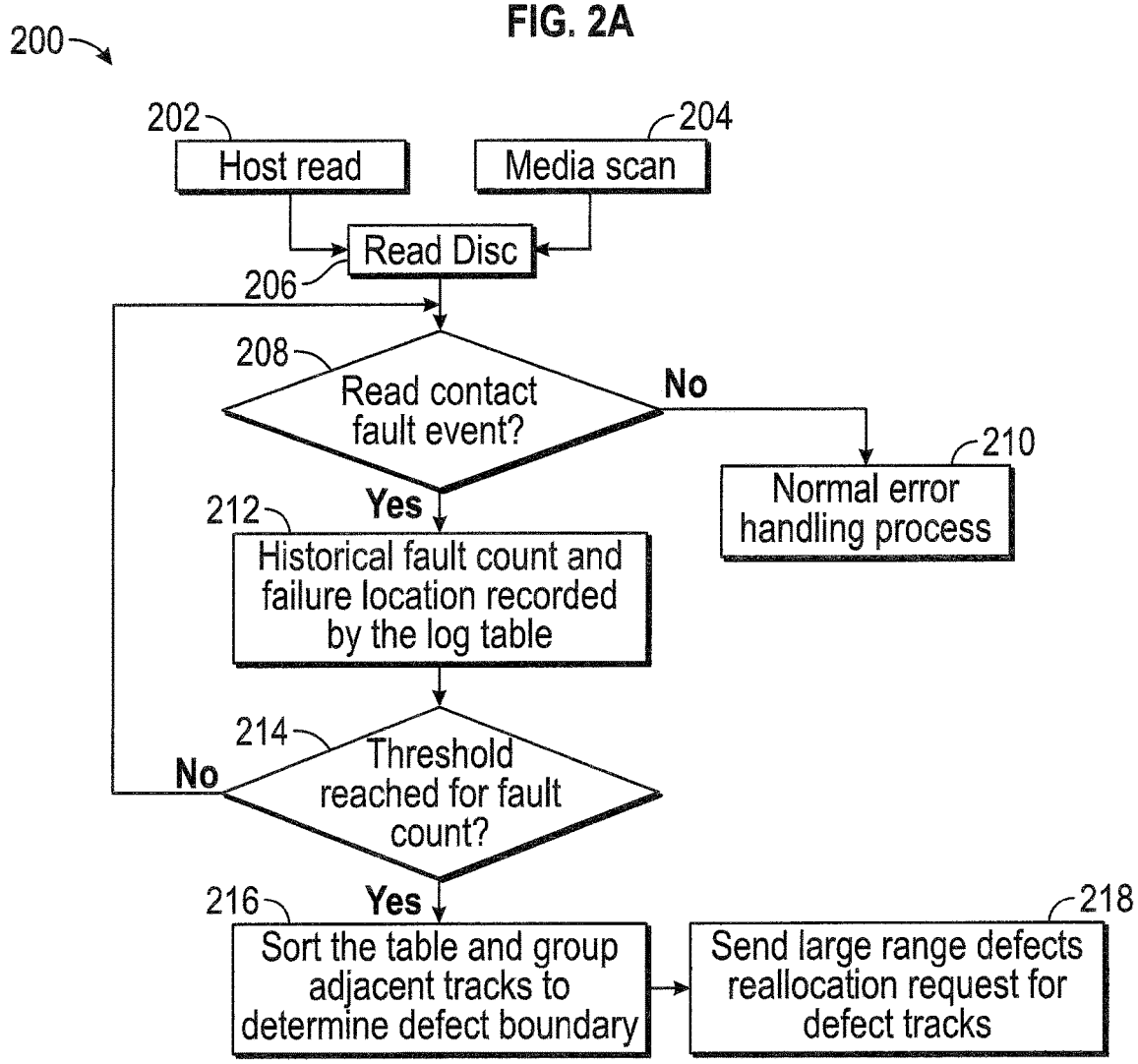
FIG. 2B is a flow chart diagram of a method according to an embodiment of the present disclosure.

FIG. 2A shows a reassigned sector table that does not have enough available space to account for a large range defect, such as hundreds of defect tracks, and which would cause a drive failure.

In one embodiment, dynamic ranged LBA remapping is performed in a data storage device such as 118 of FIG. 1 for large range defect reallocation. In order to dynamically reallocate large range defects, a determination is first made of the existence and extent of such a defect. Head-media interaction (HDI) in a HDD, for example, can cause large range defects in the field. A method 200 of detection and classification of such defects is shown in flow chart form in FIG. 2B. A host or background media scan detects potential defective tracks, such as with a host read (block 202) or media scan (block 204) that may be used to read a disc (block 206). In decision block 208, a determination is made whether a read contact fault has or has not occurred. When a read contact fault has not occurred, method 200 continues with traditional error handling process in block 210. An historical fault count and locations of faults are recorded and stored in a dedicated log table. The dedicated log table is sortable in one embodiment by physical locations, such as cylinder, head, and wedge. If a fault occurs in a location that has already had a fault, the fault count for that location is incremented.

If a read contact fault has occurred, process 200 continues with checking the stored fault count and failure location stored in the dedicated log table in block 212. A threshold for the fault count at the location is checked in decision block 214. If the threshold has not been reached, method 200 continues at decision block 208. If the fault count threshold is reached, a repeated HDI is confirmed. The log table is sorted and adjacent tracks are grouped in block 216 to determine boundaries of the defect. Once boundaries of the defect are determined, a large range defect reallocation request is made at block 218.

Too many grown servo flaws (e.g., greater than three) on a track may also use large range defect reallocation for the track with the defect, because a servo may not be able to correctly perform a seek operation in that situation.

Once a large range defect reallocation request is made to, for example, a controller (e.g., 110 of FIG. 1), reallocation of the defect is performed by the controller. With a virtualized LBA scheme described further herein, a host or background media scan detects potential defective tracks, and sends requests to reallocate. A virtualized LBA process finds healthy tracks from a free pool if there are still enough free pool tracks to use. A data management scheme copies the user data from defective or risky tracks to healthy tracks. The virtualized LBA process updates new mapping information to the healthy tracks from the free pool and marks risky tracks as defective. These tracks are not reused in the future.

Figure 3:
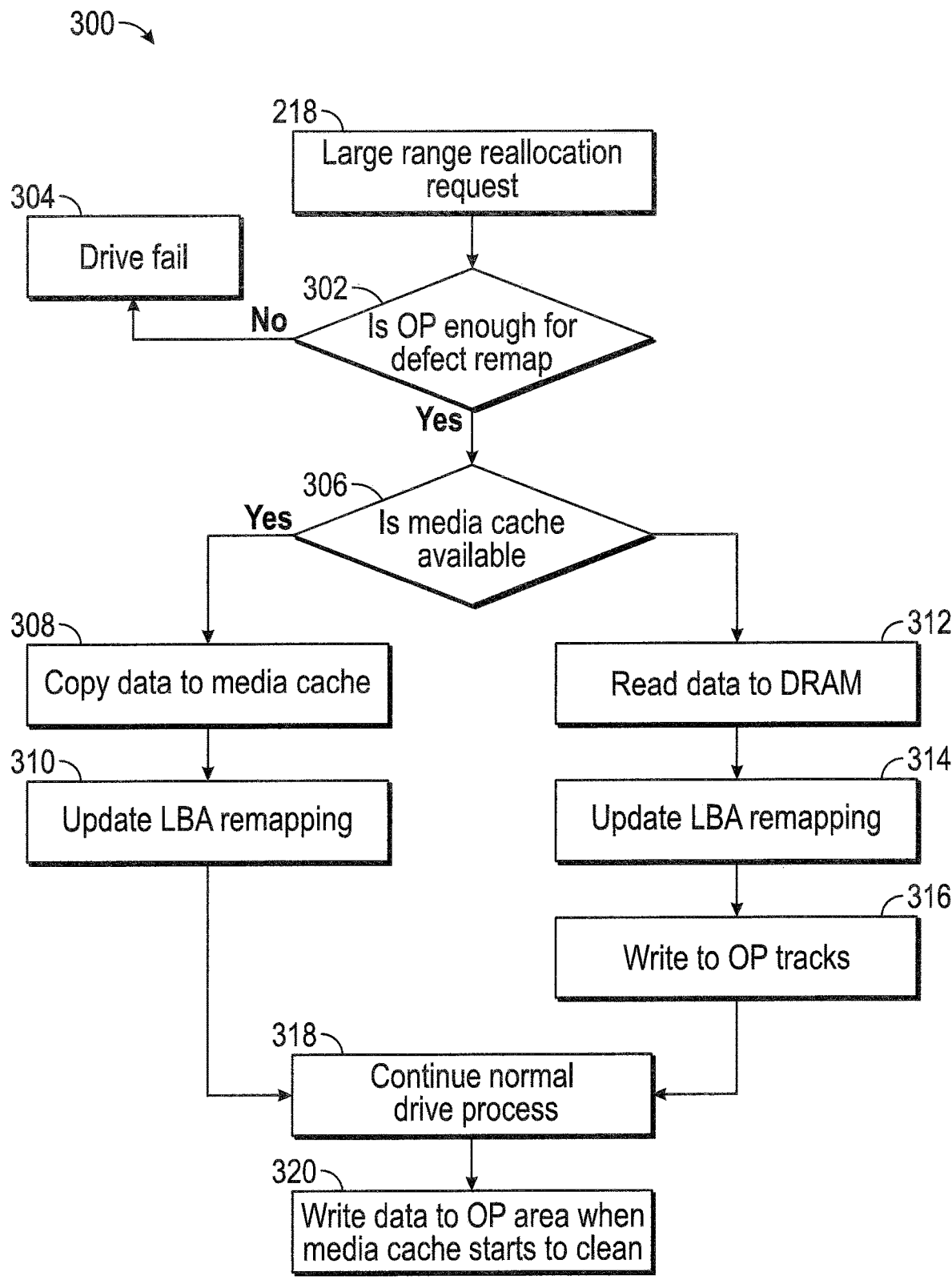
FIG. 3 is a flow chart diagram of a method according to another embodiment of the present disclosure.

In one embodiment, a method for reallocation of large range defects is shown in flow chart form in FIG. 3. A large range defect reallocation request is made at 218 (from FIG.

2). Once the reallocation request 218 is received, a reserve area (sometimes referred to as an overprovisioning area) is checked in decision block 302 to determine whether sufficient space in the reserve area is present to remap the defect, given its size. If there is insufficient reserve area space, the drive fails at 304. If the reserve space is sufficient for the requested defect range, the process 300 determines whether a media cache is available in the drive at block 306.

A media cache, if available, may be used when the data in the defect range cannot be directly written to the reserve space. Such a situation may occur due to the HDD system performing multiple tasks simultaneously or near simultaneously. For example, direct write to a reserve space may not be available if a low level write or other host tasks also are being performed or are desired to be performed at the original location of the data. To avoid this type of data mishandling, some drives use a media cache as a temporary space to store original data from a defect area in addition to new data from a host. All types of data are merged in the media cache.

When a media cache is available (for example, in a shingled magnetic recording (SMR) drive (e.g., in a drive in which tracks may be written on one or more storage discs in a partially overlaying relationship)), data to be moved in addition to new data from the host is copied to the media cache in block 308, and an LBA remapping table is updated in block 310. The remapping update records the difference between the host LBA and the disk LBA. Once the LBA remapping table is updated, in one embodiment all the data in the media cache is flashed to reserve space. The LBA remapping table is updated so that the drive can continue to service the host as soon as possible. The media cache data is, in one embodiment, moved to healthy tracks when the drive starts to clean the media cache to the main storage area at block 320.

Remapping in one embodiment includes moving data from a defect range to a reserve area. Updating a remapping table comprises recording the first LBA of a defect range, the length of the defect range, a last defect range LBA+1, and the offset from the first defect LBA to the new LBA in the reserve area.

Whether a drive has media cache is determined in block 306. For a drive that does not have an available media cache, or does not have a media cache (such as a conventional magnetic recording (CMR) drive), the drive reads data in the defect range and writes that data in addition to new data from a host to a dynamic random access memory (DRAM) buffer in block 312. The DRAM buffer serves in this embodiment to replace the media cache. Following storing of all the data in the DRAM, an LBA remapping table is updated in block 314. The remapping update records the difference between the host LBA and the disk LBA. Once the LBA remapping table is updated, the data from the DRAM is written to the reserve area in block 316. Following block 310 or block 316, normal drive processes continue at block 318. Following continuation of normal drive processes at block 318, for a storage device having a media cache, the data will be written to the OP area when the media cache starts to clean, in block 320.

Embodiments of the present disclosure have advantages over previous solutions. Such advantages include, by way of example and not by way of limitation, online operation for a better user experience, better performance after data reallocation, reduction in field returns, applicability to both CMR/SMR and future products, and the like.

SMR and CMR HDDs use a static LBA scheme. The processes above apply to use with SMR or CMR HDDs. In another embodiment, a solution is provided for a virtualized LBA scheme. Virtualized LBA schemes are employed, for example, on so-called megacache devices. In a megacache device, in one embodiment, the whole drive space uses virtualized mapping. The virtualized mapping concept includes dynamic mapping between host LBAs and disk LBAs. The LBAs are not fixed as in non-virtualized drives. In a virtualized LBA embodiment, defect remapping can be either integrated to a dynamic mapping table or individually implemented as another layer of LBA mapping.

For a traditional HDD, for example, host LBA0 is permanently mapped to disk LBA0. In a virtualized LBA scheme, host LBA0 does not necessarily map to disk LBA0. Instead, host LBA0 may be mapped to anywhere on the disk. All mapping is controlled by firmware code within a disk controller. In such a drive, a table is used to record and store all relationships between the host and the drive. Using a virtualized LBA scheme allows for correction of large defects in LBA since the virtualized mapping table is usable to handle where to remap large range defects. Therefore, instead of adding multiple lines to a remapping table, such as a line for each sector or wedge that has a defect, a single line may be added for a large defect range, indicating a defective range. Access to the defective range may then be avoided. Disks employing virtualized LBA schemes use reserve area, but typically for temporary storage of data.

Figure 4:
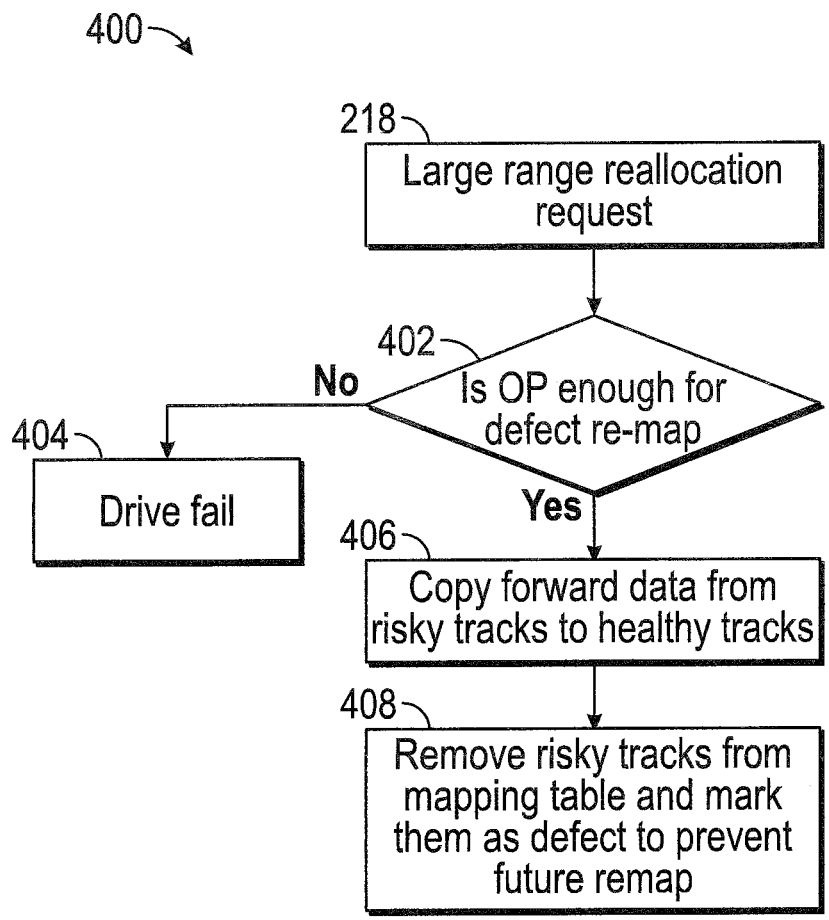
FIG. 4 is a flow chart diagram of a method according to yet another embodiment of the present disclosure.

A method 400 of large defect range reallocation in a virtualized LBA scheme drive is shown in flow chart form in FIG. 4. A large range defect reallocation requests is made at 218 (from FIG. 2). Once the reallocation request 218 is received, a reserve area is checked in decision block 402 to determine whether sufficient space in the reserve area is present to remap the defect, given its size. If there is insufficient reserve area space, the drive fails at 404. If the reserve space is sufficient for the requested defect range, the process 400 copies data from tracks in the defect range to unused tracks in the reserve area in block 406. Tracks in the defect area are removed from the LBA mapping table and marked as defective to prevent future remapping to those tracks in block 408.

Embodiments of the present disclosure provide large range defect correction using defect range lengths, therefore using much less memory space than sector by sector reallocation schemes. Multiple sectors or tracks with defects may be remapped into a similar sized table as provided in previous solutions. For example, a remapping table for remapping a 100 sector defect uses a single table entry versus 100 table entries for previous solutions. Similarly, a 100 track error which could effectively render a sector by sector defect reallocating drive unusable for lack of table size may be remapped using a single entry in the remapping table.

Embodiments of the present disclosure which place single length-based defect range entries into the remapping table also results in fewer seek/write/read/verify issues. Previous sector by sector remapping solutions perform a seek for each sector to get to the remapped sector, then a seek back. Embodiments of the present disclosure uses two seek operations for a sequential read/write. The first seek is from the starting LBA of the remapped defect to the reserve area LBA starting point. Following this, there is a sequential seek to the end of the reserve area replacement LBAs (and corresponding physical disk locations). The second seek is from the end of the reserve area physical location back to the physical location associated with the first LBA after the defect. In contrast, a sector by sector or wedge by wedge solution uses a pair of seek operations for each sector or wedge.

Figure 5:
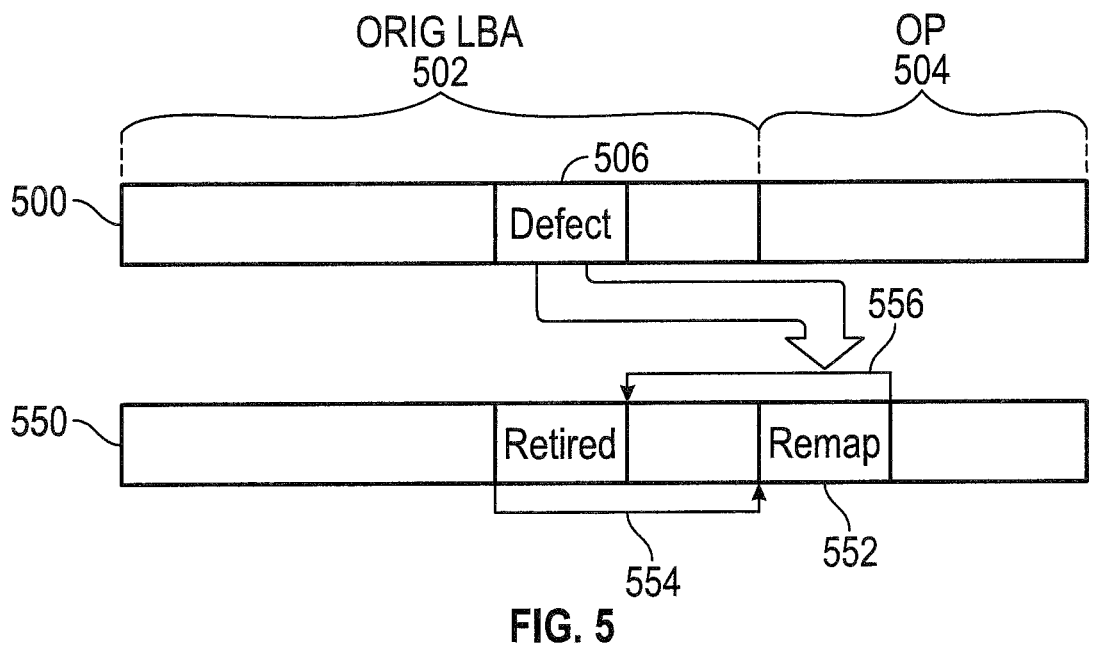
FIG. 5 is a block diagram of a logical block address space before and after a large range defect remapping.

An exemplary LBA remapping table is shown in Table 1. Referring also to FIG. 5, a remapping process is shown in block diagram form.

TABLE 1

| Entry Number | Start LBA | Length | Offset | Status |
|---|---|---|---|---|
| 0 | LBA#0 | Length_00 | Offset#0 | Non-retired |
| 1 | 1stDefectLBA | DefectLength | Offset#0 | Retired |
| 2 | LastDefectLBA + 1 | Length_01 | Offset#0 | Non-retired |
| 3 | LBA#1 | Length_1 | Offset#1 | Non-retired |
| 4 | 1stDefectLBA | DefectLength | Offset to OP | Range remapped |

Referring now to FIG. 5, an LBA space 500 is shown, where an original LBA range 502 is shown, as well as an overprovisioning range (OP) 504 is shown. In manufacturing, the original LBA range is assigned and fixed, such as in a DDT table as described below. In one embodiment, a portion of the OP range 504 is assigned to another fixed set of LBAs (see below). When a large range defect 506 occurs, the length of that defect is determined, along with its first and last LBA, and the defect is remapped into the fixed LBA portion of the OP range 504. LBA space 550 is indicative of the LBA range 500 when a large range defect 506 has been remapped into the OP area 504. When defect range 506 is assigned to LBAs in the OP range 504, a remapping table is modified, to identify the defect range as retired (Table 1, entry number 1), and to point to the remap area 552 (Table 1, entry number 4, offset). A pointer 554 (Table 1, entry number 4, startLBA) from the first LBA that is retired to the first remapped LBA is entered, and a pointer 556 from the end of the remapped range to the first LBA after the defect range is entered.

One exemplary data movement operation according to embodiments of the present disclosure is shown with respect to FIG. 5. In the movement example:

Let L be the total number of logical block addresses (LBAs) in the drive, greater than the number of LBAs in the host H (hostLBA #0-hostLBA #99)

Let P be the total number of physical block addresses (PBAs)

With a reserve area (OP) provided, L should be greater than H and P should be greater than L.

OP size=L−H

Let H=100, L=200 and P=250, then OP=200−100=100

Let the initial mapping be drive LBA #0-LBA #99 mapped to PBA #0-PBA #99. and LBA #100-LBA #199 mapped to PBA #100-PBA #199

Reserve area (OP) for large block defect remapping is originally LBA #100-LBA #199

Originally unassigned PBA #200-PBA #250 may be used for reassignment of single sector or wedge defect For example:

A drive contains a total of 200 LBAs. LBA #0-LBA #99 are initial drive LBAs, and LBA #100-LBA #199 are reserve area (OP) for large range defect LBAs remapping. The drive contains 250 PBAs, PBA #0-PBA #249.

In the drive, there is a data defect table (DDT) that stores the initial mapping of fixed LBA to PBA mapping. The DDT table is used for all drive LBAs including LBA #0-LBA #199 and includes OP, media cache LBA, and the like. The DDT is generated during the manufacturing factory process when manufacturing defect physical locations (PBAs) are determined.

In a manufacturing process, PBA #50 is defective, and is determined to be defective during the manufacturing factory process. In this case, drive LBA #0-LBA #49 are mapped to PBA #0-PBA #49, and drive LBA #50-LBA #99 are mapped to PBA #51-PBA #100. LBA #100-LBA #199 are mapped to PBA #101-PBA #200 in a defect slipping operation. This mapping is stored in the DDT. PBA #50 is defective, and is not mapped to any LBA. Remaining PBAs PBA #201-PBA #249 are also not mapped to any LBA. They are reserve area good spare sectors and may be used for reassignment in the field.

In the field, user LBA #0 becomes defective. At the time it is determined to be defective, user LBA #0 is assigned to the first good spare sector PBA #201. Later, if LBA #10 becomes defective also, it is reassigned to the second good spare sector PBA #202. Corresponding entries are made to a reassignment table (e.g., RA 116) for these reassignments of traditional defects.

Also in the field, a large range defect occurs on LBA #20-LBA #29. Instead of reassignment to PBA #203-PBA #212, these LBAs are remapped to reserve area (OP) range LBA #100-LBA #109 (PBA #101-PBA #110). Corresponding entries are made in the remapping table (e.g., RM 118). In this example, host LBA #0 accesses PBA #201, host LBA #10 accesses PBA #202, and host LBA #20 accesses PBA #101, with known defect length 10.

Values for the remapping table (see Table 1) are assigned as follows:

1stDefectLBA=LBA #20

DefectLength=10

LastDefectLBA+1=LBA #29+1=LBA #30

Offset to OP=80

Status assigned as non-retired (still active range), retired (LBA #20-LBA #29, replaced defect range), and range remapped (OP area replacing defect range)

At the host computer level, data are structured in terms of variable length files, which are constituted from one or more fixed-sized logical blocks that are addressed using LBAs. In the example, the host LBA space starts and remains as 100 LBAs addressed as host LBA #0-LBA #99. At the drive level, the LBA space is extended for large range defects (and in some cases defect slipping during manufacture) by adding addresses LBA #100-LBA #199. The host knows nothing about drive LBA #100-LBA #199. The extension of the LBA space for large range defect remapping at the drive level is provided in one embodiment.

The data defect table (DDT) generated during the factory process is still there for indicating physical locations for LBAs. Embodiments of the present disclosure are concerned with large range defect reallocation, so a reassigned sector table (e.g., RA 116) is still used in the field for small (e.g., single sector/wedge) defects.

The DDT table is generated during a manufacturing process. After manufacturing, and assignment of disk LBA mapping to disk PBAs, the mapping relationship between disk LBAs and disk PBAs is fixed, and does not change. LBAs are mapped to PBAs sequentially.

An existing reassignment table for one sector/wedge and an LBA remapping table for large range defects are used for newly emergent defects captured after the manufacturing process, such as when the drive is used in the field. For the reassignment table, one LBA is reassigned to a spare PBA which has not been mapped to any LBA for non-large range defects, as is traditional. The LBA remapping table is used to remap large range defects from user LBAs to the OP area.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device, comprising:
   one or more storage media that comprise a plurality of physical storage locations, a first portion of the physical storage locations substantially fixedly assigned to a plurality of drive logical storage locations, and a second portion of the physical storage locations assignable to an unassigned spare location; and
   a controller configured to:
      receive a physical storage location large range defect reallocation request;
      check a dedicated reserve area within the first portion of the physical storage locations for sufficient space to reallocate the large range defect;
      when there is sufficient space to reallocate the large range defect, move data in the large range defect to the dedicated reserve area; and
      remap the large range defect to the dedicated reserve area.

2. The data storage device of claim 1, and further comprising a remapping table storing information related to remapping of the large range defect.

3. The data storage device of claim 2, wherein the remapping table stores a first logical storage location of the defect, a length of the defect, and an offset to the reserve area.

4. The data storage device of claim 1, and further comprising a media cache configured to temporarily store data to be moved.

5. The data storage device of claim 1, and further comprising a dynamic random access memory configured to temporarily store data to be moved.

6. A method of reallocating large range defects in a data storage drive, comprising:
   receiving a large range defect reallocation request at a data storage drive controller;
   checking a dedicated reserve area having a substantially fixed logical to physical mapping for sufficient space to reallocate the large range defect;
   moving data in the large range defect to a portion of the dedicated reserve area; and
   remapping the large range defect to the portion of the dedicated reserve area in a remapping table, wherein remapping comprises:
      permanently assigning a plurality of dedicated logical block addresses to physical locations of the dedicated reserve area; and
      remapping the large range defect to a portion of the plurality of dedicated logical block addresses.

7. The method of claim 6, wherein receiving large range defect reallocation request comprises determining whether a large range defect is present.

8. The method of claim 7, wherein determining whether a large range defect is present comprises:
   detecting potential defective tracks in a storage device with a host read or a media scan;
   when a contact fault has occurred, storing a location of the contact fault and a count of how many contact faults have occurred at the location in a log table; and
   when the count of the contact faults at a location exceeds a threshold fault count, identifying a location and range size of a defect associated with the contact fault at the location as the large range defect.

9. The method of claim 8, wherein identifying a location and range size further comprises:
   sorting the log table; and
   grouping adjacent tracks to determine boundaries of the defect.

10. The method of claim 6, wherein moving data comprises identifying an area in the reserve area, copying the data in the defect range to the identified range in the reserve area, and updating a remapping table to identify a new physical location to the remapped data.

11. The method of claim 6, wherein the reserve area is reserved for large range defect relocation.

* * * * *